United States Patent [19]
Fisher

[11] 3,760,654
[45] Sept. 25, 1973

[54] METALLURGICAL VESSEL DRIVE
[75] Inventor: Howard M. Fisher, New Castle, Pa.
[73] Assignee: Pennsylvania Engineering Corporation, Pittsburgh, Pa.
[22] Filed: Jan. 17, 1972
[21] Appl. No.: 218,427

[52] U.S. Cl. ............... 74/661, 74/665 B, 74/665 D, 74/665 E, 74/410
[51] Int. Cl. ...................... F16h 37/06, F16h 57/00
[58] Field of Search .............. 74/661, 665 A, 665 B, 74/665 D, 665 E, 410, 665 C

[56] References Cited
UNITED STATES PATENTS
| | | | |
|---|---|---|---|
| 3,207,002 | 9/1965 | Lakin et al. | 74/665 B |
| 3,390,585 | 7/1968 | Henne | 74/410 |
| 3,517,566 | 6/1970 | Cornford | 74/410 X |
| 2,826,096 | 3/1958 | Hoge | 74/661 |
| 1,563,405 | 12/1925 | Schlumberger | 74/661 |
| 3,576,106 | 4/1971 | Nowicki | 74/661 X |
| 3,232,137 | 2/1966 | Klovers | 74/665 B |

Primary Examiner—Arthur T. McKeon
Attorney—Ralph G. Hohenfeldt et al.

[57] ABSTRACT

The driven gear of a tiltable metallurgical wheel is fastened to the trunnion shaft on which the vessel is journaled. The gear is in a housing and pairs of drive motors are supported on axially opposite sides of the housing and are coaxially coupled to a common shaft which extends across the interior of the housing. The common shaft has dual pinion gears which are the first in a gear reduction system that operates the driven gear when the motors are energized. The housing is split horizontally into at least two sections so that when the upper section is removed, the gears in the speed reduction train are exposed for maintenance.

20 Claims, 4 Drawing Figures

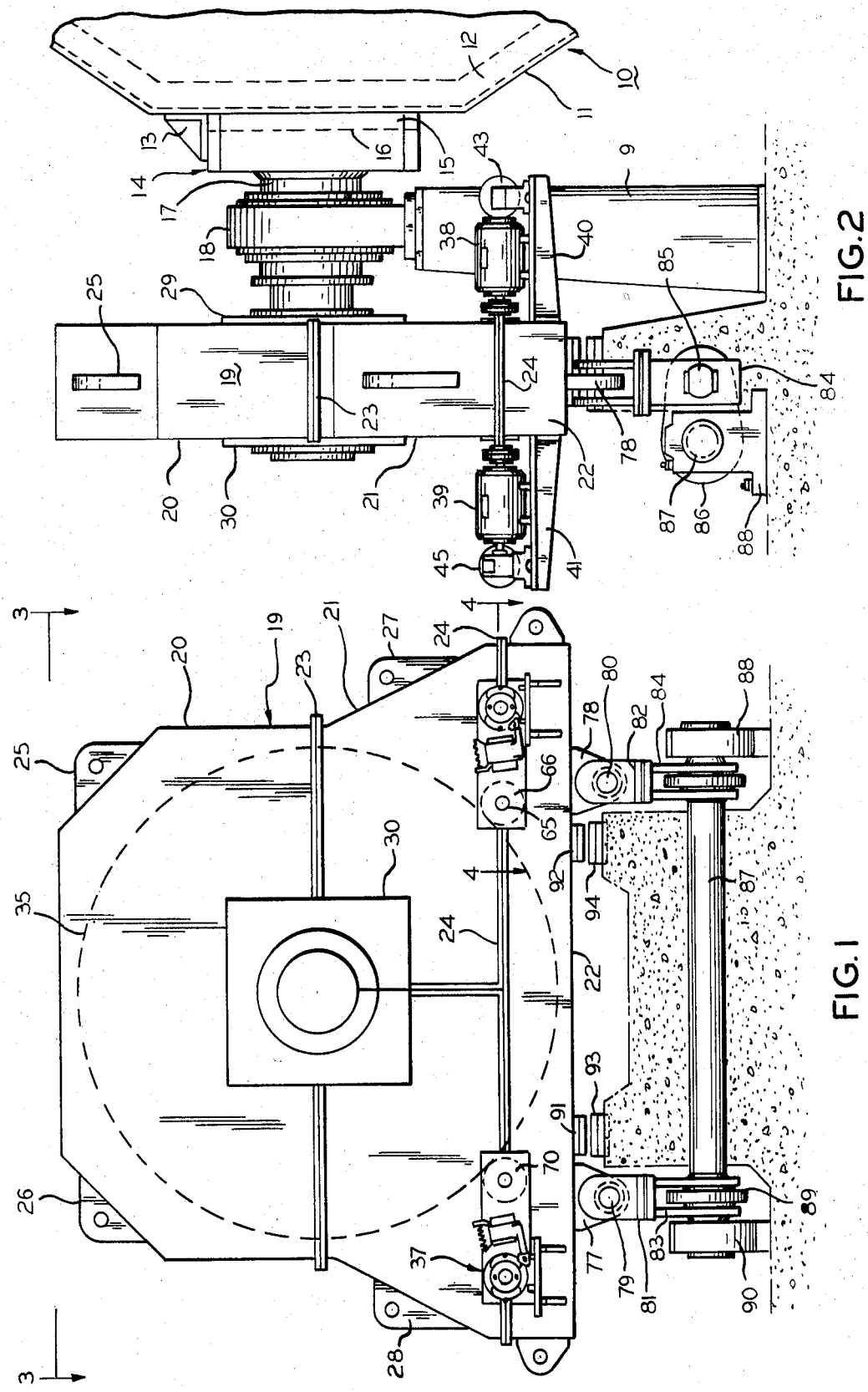

METALLURGICAL VESSEL DRIVE

BACKGROUND OF THE INVENTION

This invention relates to an improved drive mechanism for angulating or rotating metallurgical vessels or other heavy apparatus. Such drive mechanism may be used, for example, to angulate a vessel for converting impure molten ferrous metal to steel by blowing oxygen therein or in connection with other metal treating or refining vessels or furnaces.

The new drive mechanism will be illustrated in connection with a steel converter vessel. Generally, a vessel of this type is angulated at a slow rate as compared with the rotational rate of the motors which are used to drive it. Thus, a speed reduction system must be interposed between the driving motor and the large driven gear which is directly affixed to trunnion shaft on which the vessel is journaled for rotation. In one prior art drive mechanism, a gear housing is journaled on the trunnion shaft and anchored against rotation. The drive motors are mounted on a side of the gear housing which is most remote from the vessel and each motor is coupled with a speed reducer which is also outside of the housing but has its output shaft extending into the housing and carrying a pinion which engages with the large driven gear. The motors and their associated speed reducers are usually equiangularly spaced around the axis of the trunnion shaft so that the system is symmetrical and the driving forces are balanced. However, the bending forces on the speed reducer output shafts are high because the pinions are remote from the bearings of the shafts. This results in the pinions and the driven gear not meshing squarely in which case the gears bevel or wear out more rapidly on one side and have to be replaced more frequently than is desirable. Another problem with this type of drive is that load distribution on the gear housing as well as the gears is poor because all of the load of the motors and their speed reducers is imposed on one side of the housing and all driving is from one side of the large driven gear.

In another type of drive mechanism, the driven gear on the trunnion shaft is within a housing and several speed reducers are mounted independently of the housing and adjacent thereto. The output shafts of the speed reducers extend into the gear housing and have pinions on them which engage with the large driven gear. The motors are usually mounted on the floor or separate foundations adjacent the speed reducers. This type of drive mechanism is also disadvantageous in that the pinions on the output shafts of the speed reducers are also subject to torsional deflection which results in uneven wearing of the gears and contributes to their premature deterioration. Another disadvantage of this type of drive is that much space is required to accommodate it in the vicinity of the vessel where space is at a premium. The space problem is made even more severe by the fact that as many as four motors are used to drive the mechanism which means that if they are to all be at the same level two of them must be set back from the other two or if they are at different levels, foundations must be provided for supporting two motors at the upper level. In either case, access to the interior of the gear housing is difficult.

SUMMARY OF THE INVENTION

An object of the present invention is to overcome the above-noted disadvantages with a drive mechanism that has half of the total number of motors mounted on one side of the gear housing and the other half of the total number mounted on the other side so that opposed pairs of motors can drive a single input shaft and an ensuing gear reduction system in the housing so as to obtain balanced load distribution on the gear housing and uniform distribution of the torsional forces on the motor shafts and the pinions carried thereon.

Another object of this invention is to so arrange the motors and the speed reducing gear trains that the gear housing can be made in sections of which one is removable to expose the gear and bearings for maintenance without disturbing their normal arrangement.

Another object of this invention is to provide a drive mechanism in which all of the gears and bearings reside in a lower section of the gear housing that serves as an oil sump or pan which allows these parts to be bathed in lubricant without the use of a forced lubricating system.

How the foregoing and other more specific objects are achieved will appear in a more detailed description of a preferred embodiment of the invention which will be set forth hereinafter.

In general terms, an illustrative embodiment of the new drive mechanism is characterized by a gear housing into which the trunnion shaft of a rotatable metallurgical vessel extends. There is a large driven gear or bull gear, as it is commonly called, affixed to the trunnion shaft or to an extension thereof. The bull gear is driven from both sides by drive motors which are mounted on each side of the gear housing with their shafts aligned and coupled to a common shaft which extends across the interior of the gear housing and carries driving pinions. There are two or more sets of oppositely paired motors driving the bull gear and each set is coupled to the bull gear with a single gear reducing system instead of individual speed reducers for each motor as was the case heretofore. The gear housing is made in sections and the lower section which houses the speed reducing gear system and supports the motors may remain in place when the other section or sections are removed for maintenance purposes.

DESCRIPTION OF THE DRAWINGS

FIG. 1 is a front elevational view of the new drive mechanism;

FIG. 2 is a side elevational view of the right side of the drive mechanism shown in FIG. 1 along with a fragment of a converter vessel with which the drive mechanism is associated;

DESCRIPTION OF A PREFERRED EMBODIMENT

Figure 3:
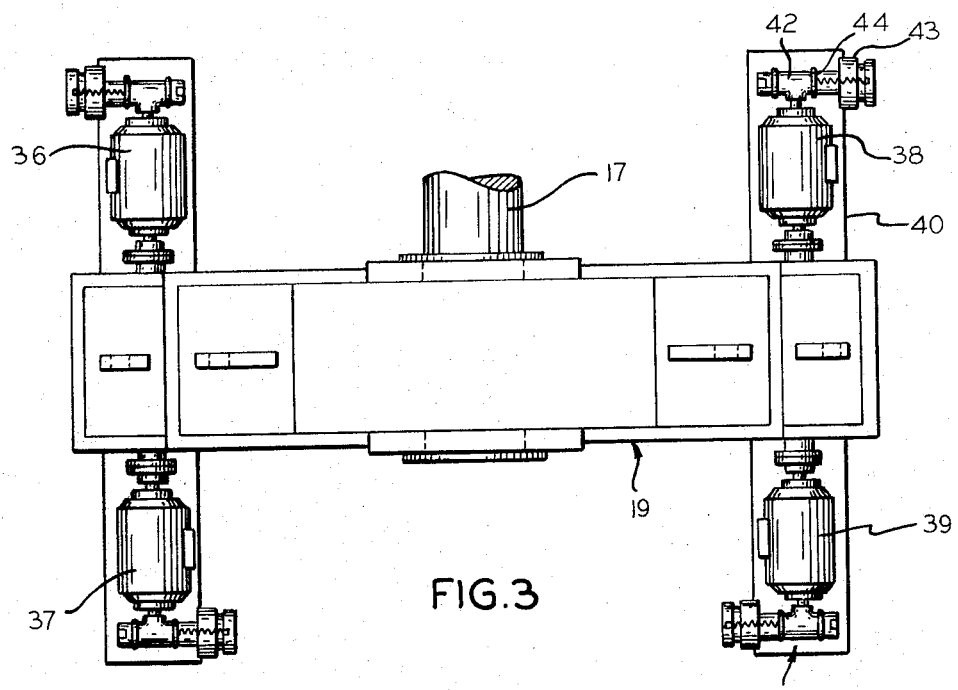
FIG. 3 is a plan view of the drive mechanism, omitting the vessel except for a fragment of its trunnion shaft.

FIG. 2 shows a fragment of a converter vessel which comprises a metal shell 11 that is lined with refractory material 12. The converter vessel may be a type that is used for making steel by means of the top-blown or bottom-blown basic oxygen method in which high pressure oxygen is injected into impure hot metal to convert the same to steel. The vessel is generally cylindrical and has tapered upper and lower ends. By means of a plurality of brackets 13, which are merely symbolized, vessel 10 may be supported on a trunnion ring 14 with an annular gap 15 surrounding it.

Extending from a block 16 in ring 14 is a horizontally disposed trunnion shaft 17 which is journaled in a bearing structure 18. The bearing structure is mounted on a stand 9 which may bear on a suitable concrete footing. It will be understood that vessel 10 is further supported by a trunnion shaft extending from trunnion ring 14 diametrically opposite from shaft 17. Shaft 17 extends into a gear housing which is generally designated by the numeral 19 and is comprised of three separable sections 20, 21 and 22. The sections are flanged together on horizontal parting lines by flanges 23 and 24. The clamping bolts for the flanges are not shown in the drawings. The upper section 20 of the housing has integral apertured lifting lugs 25 and 26 for making a hitch if it is desired to remove the section 20 with a crane. The intermediate section 21 also has lifting lugs 27 and 28 which are for the same purpose. Bull gear 35 is mounted and keyed on shaft 17. Gear housing 19 is supported on bearings in capsules 29 and 30 which in turn are mounted on the hub extensions of gear 35. This makes it possible to ship the assembled gears, bearings and housing as a unit from the manufacturing plant to the installation site where it is mounted on shaft 17 as an assembly without requiring field labor to reassemble the drive.

Figure 4:
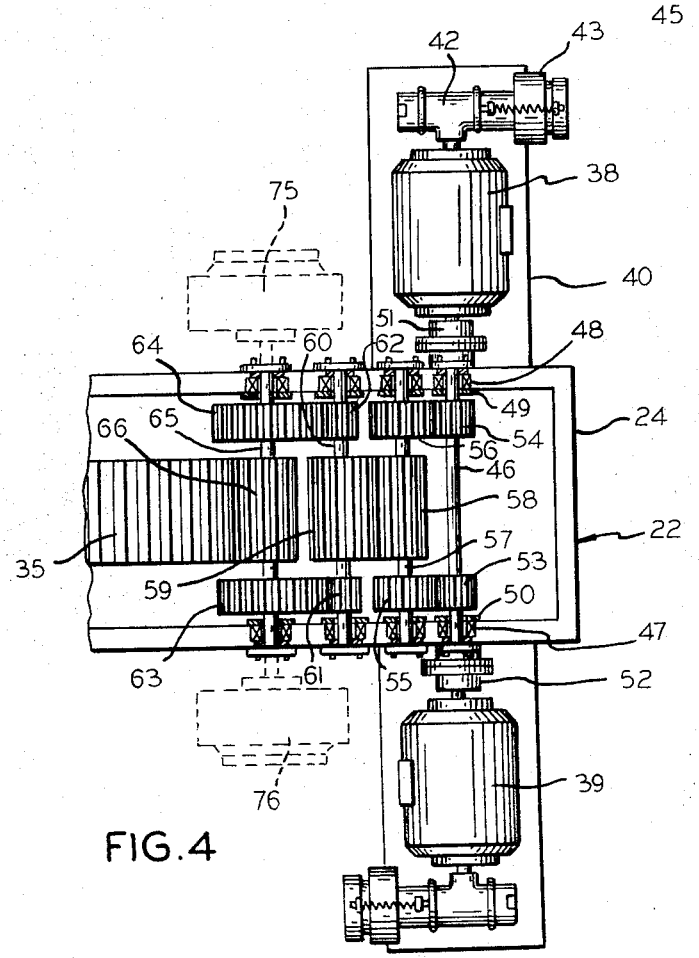
FIG. 4 is a fragmentary section of the drive mechanism taken in a plane corresponding with 4—4 in FIG. 1.

Fastened to trunnion shaft 17 within housing 19 is a large driven gear or bull gear 35 a fragment of which is visible in FIG. 4 and the circumference of which is outlined in dashed lines in FIG. 1. The angulation or rotational rate of the vessel 10 and bull gear 35 are the same since the gear is fixed to the vessel shaft.

In this embodiment, four motors 36, 37, and 38, 39 are used to drive the bull gear 35. The motors are of such capacity that any two of them are capable of driving the vessel for a sufficiently long period to allow removal of a heat of molten metal from vessel 10. Any three of the motors have sufficient capacity and rating to drive the vessel for any number of heats that may have to be produced until the vessel is otherwise taken out of service for replacing its refractory lining. Thus, in a sense, the drive mechanism has redundant power which assures that the vessel may be angulated under power without having to resort to manual means for discharging the vessel contents if one or two of the drive motors 36-39 fails.

As can be seen particularly well in FIGS. 2–4, the motors are arranged in pairs on opposite sides of gear housing 19. One such pair includes motors 36 and 37 and the other pair includes motors 38 and 39. Since the arrangement is symmetrical and one pair of motors is mounted and functions in the manner of the other, only the one pair including motors 38 and 39 and their associated parts will be described in detail. For instance, motor 38 is mounted on a bracket 40 which extends in cantilever fashion from lower housing section 22 to which it is rigidly attached, see FIGS. 2 and 3. Motor 39 is similarly mounted on a bracket 41. The rear end of motor 38 has a brake pulley 42 and an electromagnetic brake operator 43 for actuating brake shoes 44. Motor 39 has a similar brake assembly which is generally designated 45. As can be seen in FIG. 4, extending across the interior of gear housing section 22 is a power input shaft 46 that is journaled in bearings 47 and 48 which are each set in lower gear housing section 22 with half of their diameters extending above the plane of flange 24. The lower section of gear housing 22 also serves as an oil pan which may, during operation of the drive mechanism, be filled with lubricating oil to near the level of flange 24. Bearing ring retainers 49 and 50 have suitably large central apertures to permit lubricating oil to bathe the bearings by gravity feed rather than a pressure lubricating system.

Power input shaft 46 extends through bearing 48 and out of the gear housing where it is joined to the shaft of motor 38 by means of a coupling 51. Similarly the other end of shaft 46 is joined with the shaft of motor 39 by means of a coupling 52. As can be seen in FIG. 4, power input shaft 46 has axially spaced apart pinions 53 and 54 affixed on it. Pinions 53 and 54 mesh respectively with gears 55 and 56 which are both affixed to a shaft 57. Another gear 58 having fewer teeth than the last mentioned gears is also fixed on shaft 57. Gear 58 is meshed with and drives a gear 59 which is fixed on a shaft 60 on which are also fixed a pair of similar gears 61 and 62. Gears 61 and 62, respectively, drive larger gears 63 and 64 which are fixed on a power output shaft 65 along with a pinion 66. The four shafts 46, 57, 60 and 65 are supported in bearings that are mounted in oil pan 22 in a fashion similar to that in which motor or power input shaft 46 is journaled in the gear housing.

There is considerable rotational speed reduction between power input shaft 46 which operates at the speed of the motors 38 and 39 and the power output pinion 66 in the gear train. Pinion 66, moreover, meshes with bull gear 35 and there is a high ratio between the bull gear and the pinion which results in bull gear 35 turning relatively slowly as compared with the rotational speed of the motors 38 and 39. It will be evident that torque applied simultaneously by motors 38 and 39 to the parallel shafts 46, 57, 60 and 65 will be substantially equal and in the same direction at all times so that even when the high inertia load is undergoing acceleration or deceleration there will be no torsional deflection of the shafts nor will misalignment of the gears occur. Thus, force distribution on the gears is more uniform and the gears wear more evenly than in prior drive mechanisms.

The other pair of motors 36 and 37 are located symmetrically on the opposite side of the axis of bull gear 35 from which motors 38 and 39 which were just described are located. Motors 36 and 37 are also coupled to a single power input shaft, not shown, which is similar to shaft 46 and is parallel to it. The manner in which motors 36 and 37 are coupled with bull gear 35 by means of a gear train is comparable to the manner in which motors 38 and 39 are coupled thereto as shown in FIG. 4 and as described above so the description will not be repeated. In FIG. 1, one may see, however, that there is a power output pinion 70 which engages bull gear 35 in a manner similar to which it is engaged by output pinion 66.

As described above, the gear reduction systems associated with motors 38, 39 and 36, 37 are mounted in the main gear housing 19. It will be understood, however, by those skilled in the art that the gear reduction systems for the individual pairs of motors could be mounted in housings that are separable from the main housing 19 in which case the motors and their associated gear trains would be removable for maintenance.

The principles of a drive mechanism which couples two motors to a single power input shaft is applicable to drive mechanisms which use hydraulic motors as well as electric motors such as 38, 39 and 36, 37. In FIG. 4 the manner of adapting the drive for use of hydraulic motors is suggested. Two of the hydraulic motors are shown in phantom and are marked with the numerals 75 and 76. These motors may be directly connected to opposite ends of output shaft 65 so as to turn pinion 66 jointly and thereby drive bull gear 35. When hydraulic motors are used, the only gear necessary is pinion 66 which is mounted on shaft 65. All of the other gears and shafts may be eliminated because there is no need for speed reduction other than that which is obtained by the ratio between bull gear 35 and pinion 66 since the hydraulic motors operate at low variable speed and develop high torque at all speeds. Of course, if hydraulic motors such as 75 and 76 in FIG. 4 are used in pairs, there would be another pair symmetrically located on the opposite side of the gear housing so that bull gear 35 would be driven at two places at least. The hydraulic motors should have ratings that enable any two of them to drive the vessel at least until a single heat is completed in vessel 10 and any three of them should have an adequate rating for driving the vessel for an extended period of time such as until it is required to take the vessel out of service for replacement of its refractory lining.

It will be evident that means are required to prevent rotation of gear housing 19 when the vessel is driven by motors which are mounted on the gear housing. As explained earlier, gear housing 19 is supported on and maintained in alignment with trunnion shaft 17 by mounting the gear housing on bearings which are in bearing capsules 29 and 30. Gear housing 19 is further supported by way of engaging its lower section 22 with a torsion bar arrangement as will now be described. Extending integrally from the bottom of lowest gear housing section 22 are a pair of lugs 77 and 78 which are connected by means of pins 79 and 80 to clevises 81 and 82. Each of these clevises has a right angularly related downwardly extending clevis 83 and 84 extending from it. As can be seen particularly well in FIG. 2, clevis 84, for example, is engaged by means of a pin 85 with a torsion arm 86 which is affixed on a torsion bar 87 that is in turn journaled for minimal rotation in a bearing block 88. As can be seen in FIG. 1, the other downwardly extending clevis 83 connects with another torsion arm 89 which is also fixed on torsion bar 87. The left end of torsion bar 87 is also journaled for minimal rotation in a bearing block 90. It will be evident from viewing FIG. 1 that if the drive motors 36-39 are operated in a direction which would tend to turn gear housing 19 in one direction or another, the force will be resisted by torque developed in torsion bar 87. Shock loads which result from suddenly starting or stopping vessel angulation are also absorbed by the torsion bar 87. Rotation of gear housing 19 is limited under all circumstances by stops 91 and 92 which are affixed to the bottom of lowest gear housing section 22. These stops 91 and 92 will strike stationary blocks 93 and 94 to limit rotation of the gear housing 19 and prevent overstress of the torsion bar system if the housing is turned too much.

Although preferred embodiments of the new vessel drive mechanism have been described in considerable detail, such description is intended to be illustrative rather than limiting for the invention may be variously embodied and is to be limited only by interpretation of the claims which follow.

I claim:

1. A metallurgical vessel mounted on a generally horizontally extending first shaft means for pivotal movement,
   a. a driven gear fastened on said first shaft means in a generally normal relation thereto,
   b. housing means enclosing at least a portion of said driven gear,
   c. a first pair of reversible motor means mounted on axially opposite sides of said housing means,
   d. a pinion gear rotatable about an axis generally parallel to that of said first shaft means and meshing with said driven gear, and
   e. first and second coupling means each operatively connecting one of said first and second motor means normally in concurrent substantially symmetrical driving relationship to a different axial side of said pinion gear so that both of said motor means may drive said driven gear simultaneously in either direction with substantially balanced driving force applied to said different axial sides whereby said axis of said pinion gear will not deflect substantially from said parallel relation with respect to the axis of said driven gear.

2. The invention set forth in claim 1 wherein:
   a. each of said motor means includes a motor shaft, said motor shafts being generally coaxial and spaced from each other,
   b. input shaft means journaled in said housing means, said first and second coupling means couples said input shaft means to both of said motor shafts,
   c. output shaft means journaled in said housing means, said output shaft means having said pinion fixed thereon
   d. each of said first and second coupling means including gear means operatively coupling said output shaft means and said input shaft means.

3. The invention set forth in claim 2 wherein:
   a. said input shaft means and said output shaft means are in substantial parallelism with each other, and
   b. other shafts in substantial parallelism with each other and with said input and output shafts, all of said other shafts being journaled in said housing means, and
   c. the gear means of said first and second coupling means being fixed on said parallel shafts.

4. The invention set forth in claim 1 including:
   a. a second pair of substantially similar reversible motor means mounted on axially opposite sides of said housing means,
   b. a second pinion gear rotatable about an axis generally parallel to said first shaft means and meshing with said driven gear, and
   c. third and fourth coupling means operatively connecting said second pinion gear with both of said second pair of motor means said coupling means being normally in substantially symmetrical driving relationship with said second pinion so that either or both of the motors of said second pair of motor means may drive said driven gear individually or simultaneously, respectively, and so the axis of said second pinion will not deflect substantially from said parallel relationship with respect to the axis of said driven gear but will be subjected primarily to balanced torsional driving forces to thereby substantially prevent uneven wear and stress on the teeth of said pinion and driven gear.

5. The invention set forth in claim 1 wherein said housing means is supported on said shaft and including:
   a. means cooperating with said gear housing means for resisting rotational movement of said housing means on said shaft means.

6. The invention set forth in claim 1 including:
   a. power output shaft means journaled in said housing about an axis substantially parallel to the axis of said driven gear, and
   b. said motor means are a pair of reversible hydraulic motors that are mounted on axially opposite sides of said housing means, said hydraulic motor means having shafts that are coaxial, each of said hydraulic motor means shafts being coupled coaxially with said power output shaft means and
   c. said pinion gear being fixed to said output shaft.

7. The invention set forth in claim 6 including:
   a. a second pair of hydraulic motor means mounted on axially opposite sides of said housing means, each of said motor means having a shaft,
   b. a second power output shaft means journaled in said housing with its axis substantially parallel to the axis of said driven gear, the shafts of said second hydraulic motor means being coaxial and each shaft being coupled coaxially with said second output shaft means, and
   c. pinion means fixed to said second output shaft means and engageable with said driven gear.

8. The invention set forth in claim 6 wherein said housing means is supported on said shaft means and including:
   a. means cooperating with said gear housing means for resisting rotational movement of said housing means on said shaft means.

9. The invention set forth in claim 1 wherein:
   a. said housing means comprises a lower section and at least one section which is removable therefrom,
   b. the means which operatively connect the pinion gear with the motor means shafts including gear means and shafts on which said gear means are mounted, the last named shafts being journaled in said lower housing section, whereby the shafts and the gear means thereon may be exposed but may remain in place when said upper section is removed from the lower section.

10. A metallurgical vessel, a shaft mounted on said vessel and journaled for rotation on stationary support means:
    a. a driven gear fixed on said vessel shaft,
    b. housing means for said driven gear, said housing means comprising at least two sections at least one of which is separable from another that is relatively fixedly mounted,
    c. a power output shaft having pinion gear means fixed thereon and engageable in driving relation with said driven gear, said output shaft having its axis in parallelism with the axis of said driven gear and being journaled in said relatively fixedly mounted gear housing section,
    d. a pair of reversible motor means mounted respectively on axially opposite sides of said relatively fixedly mounted housing section, and
    e. means operatively coupling one of said motor means to said power output shaft on each of the opposite sides of said pinion gear whereby each of said motor means will normally apply substantially balanced driving forces to said output shaft so that the axis of said power output shaft will not deflect substantially from said parallelism with said axis of said driven gear and thereby minimize uneven wear on the teeth of said pinion and said driven gear.

11. The invention set forth in claim 10 wherein:
    a. said first pair of motor means are each hydraulic motors which have shafts that are coaxial with each other and with said power output shaft and which motor shafts are directly coupled to said output shaft.

12. The invention set forth in claim 10 including:
    a. a plurality of shafts journaled in said relatively fixedly mounted housing means section and in substantial parallelism with said power output shaft,
    b. said motor means in the first pair having their respective shafts coaxial and directed toward each other and coupled to respectively opposite ends of one of said last named shafts,
    c. said plurality of shafts having gear means fixed thereon and operatively coupling said one shaft to said power output shaft.

13. The invention set forth in claim 10 wherein:
    a. said relatively fixedly mounted housing section is hollow and adapted to contain lubricating fluid for bathing the shaft journals and gear means within said housing.

14. In a drive mechanism for a metallurgical vessel that has a generally horizontally extending shaft mounted thereon and journaled for rotation in a stationary support means:
    a. a driven gear fixed on said vessel shaft,
    b. housing means enclosing said driven gear, said housing means being supportingly journaled on said shaft,
    c. a plurality of reversible motor means supported in pairs from said gear housing means and on axially opposite sides thereof, the shafts of motors on one side being disposed in the opposite axial direction and coaxially with the shafts on the other side,
    d. a power input shaft journaled in said housing coaxially with said motor shafts,
    e. means coupling opposite ends of said input shaft to respectively opposite motor shafts for said motors normally to apply substantially balanced driving forces to said input shaft,
    f. axially spaced apart pairs of pinions fixed on said input shaft adjacent to where said input shaft is journaled said pinions thereby being arranged to transmit substantially balanced driving forces,
    g. an output shaft having its axis in substantial parallelism with said input shaft and having a pinion fixed thereon which is engaged with said driven gear,
    h. a pair of gears fixed on said output shaft adjacent axially opposite ends of said pinion, and
    i. a pair of gear trains operatively coupling each of said axially opposite gears on said output shaft respectively with a respective pinion on the input shaft, whereby both motor means in a pair may drive said driven gear and the driving forces on said output shaft will be substantially balanced to thereby minimize deflection of said output shaft so that the teeth on said output shaft pinion and the teeth on said driven gear will not wear or be loaded unevenly, and j. means cooperating with said housing means for resisting rotational movement of said housing means.

15. Apparatus comprising:
a. a metallurgical vessel having a pair of trunnion shafts affixed thereto and extending generally horizontally from diametrically opposite sides of said vessel, said trunnion shafts being journaled in stationary support means for supporting said vessel for rotation with said shafts,
b. a driven gear fastened to one of said trunnion shafts,
c. housing means supported on said shaft and enclosing at least a portion of said driven gear, said housing being mounted to permit rotation of said shaft within said housing,
d. a pair of reversible motor means mounted on axially opposite sides of said housing means each of said motor means having a shaft,
e. pinion gear means mounted in said housing means for rotation about an axis substantially parallel to the axes of said trunnion shafts,
f. a first power input shaft journaled in said housing and means coupling said pair of motor means to said input shaft,
g. individual means normally operatively connecting said first power input shaft to said driven gear to drive said driven gear simultaneously, said individual coupling means applying balanced torsional forces on said pinion gear whereby to avoid deflection thereof so that said pinion gear will not engage said driven gear unevenly.

16. The invention set forth in claim 15 wherein:
a. said driven gear has axially extending hubs on each side thereof, and
b. said housing means is journaled on said hubs.

17. The invention set forth in claim 15 including:
a. a second pair of reversible motor means mounted on axially opposite sides of said housing means, each of said motor means having a shaft,
b. second power input shaft means journaled in said housing means and coupled to both of said second motor means shafts, and
c. individual means normally operatively connecting said second power input shaft means to said driven gear whereby either or both of said second motor means in a pair may drive said driven gear individually or simultaneously, respectively.

18. The invention set forth in claim 17 wherein:
a. said housing means comprises a lower section and at least one section which is removable therefrom,
b. the means which operatively connect the driven gear with the first and second power input shaft means including gear means and shafts on which said gear means are mounted, the last named shafts being journaled in said lower housing section, whereby the shafts and the gear means thereon may be exposed but may remain in place when said upper section is removed from the lower section.

19. The invention set forth in claim 15 including:
a. brake means coupled to each of said motor means for selectively stopping said vessel in a plurality of angular positions and maintaining said vessel in said position.

20. The invention set forth in claim 15 wherein:
a. said motor means comprise electric motors.

* * * * *